(12) United States Patent
Sullivan et al.

(10) Patent No.: US 9,119,992 B2
(45) Date of Patent: Sep. 1, 2015

(54) GOLF BALL MATERIALS BASED ON BLENDS OF POLYAMIDE AND ACID ANHYDRIDE-MODIFIED POLYOLEFINS

(75) Inventors: Michael J. Sullivan, Barrington, RI (US); Mark L. Binette, Mattapoisett, MA (US); Brian Comeau, Berkley, MA (US); David A. Bulpett, Boston, MA (US); Robert Blink, Newport, RI (US)

(73) Assignee: Acushnet Company, Fairhaven, MA (US)

(*) Notice: Subject to any disclaimer, the term of this patent is extended or adjusted under 35 U.S.C. 154(b) by 528 days.

(21) Appl. No.: 13/451,671

(22) Filed: Apr. 20, 2012

(65) Prior Publication Data
US 2013/0281233 A1    Oct. 24, 2013

(51) Int. Cl.
| | |
|---|---|
| A63B 37/00 | (2006.01) |
| A63B 37/02 | (2006.01) |
| C08K 5/20 | (2006.01) |
| C08K 5/098 | (2006.01) |
| C08L 77/00 | (2006.01) |
| C08L 77/02 | (2006.01) |
| C08L 77/06 | (2006.01) |
| A63B 45/00 | (2006.01) |

(52) U.S. Cl.
CPC .......... *A63B 37/0063* (2013.01); *A63B 37/0003* (2013.01); *A63B 37/0024* (2013.01); *A63B 37/0039* (2013.01); *A63B 37/0044* (2013.01); *A63B 37/0051* (2013.01); *A63B 37/0075* (2013.01); *A63B 37/0076* (2013.01); *A63B 37/0092* (2013.01); *C08L 77/02* (2013.01); *C08L 77/06* (2013.01); *A63B 37/0043* (2013.01); *A63B 37/0045* (2013.01); *A63B 37/0046* (2013.01); *A63B 37/0049* (2013.01); *A63B 37/0061* (2013.01); *A63B 37/0062* (2013.01); *A63B 37/0065* (2013.01); *A63B 37/0069* (2013.01); *A63B 37/0078* (2013.01); *A63B 37/0095* (2013.01); *A63B 45/00* (2013.01); *A63B 2209/00* (2013.01); *C08K 5/098* (2013.01); *C08K 5/20* (2013.01)

(58) Field of Classification Search
None
See application file for complete search history.

(56) References Cited

U.S. PATENT DOCUMENTS

| | | | |
|---|---|---|---|
| 5,703,166 A | 12/1997 | Rajagopalan et al. | |
| 5,705,565 A * | 1/1998 | Hughes et al. | 525/65 |
| 5,824,746 A | 10/1998 | Harris et al. | |
| 5,981,658 A | 11/1999 | Rajagopalan et al. | |
| 6,150,462 A | 11/2000 | Rajagopalan et al. | |
| 6,274,669 B1 | 8/2001 | Rajagopalan | |
| 6,476,130 B1 | 11/2002 | Rajagopalan et al. | |
| 6,562,906 B2 | 5/2003 | Chen | |
| 6,756,436 B2 | 6/2004 | Rajagopalan et al. | |
| 6,774,184 B2 | 8/2004 | Rajagopalan et al. | |
| 6,800,690 B2 | 10/2004 | Rajagopalan et al. | |
| 6,833,400 B2 | 12/2004 | Ichikawa et al. | |
| 6,872,774 B2 | 3/2005 | Sullivan et al. | |
| 7,348,046 B2 | 3/2008 | Liedloff et al. | |
| 7,528,196 B2 | 5/2009 | Kim et al. | |
| 2001/0046906 A1 | 11/2001 | Rajagopalan et al. | |
| 2007/0129172 A1* | 6/2007 | Cavallaro | 473/371 |
| 2009/0170634 A1* | 7/2009 | Loper et al. | 473/373 |
| 2010/0160079 A1 | 6/2010 | Kim et al. | |
| 2010/0160082 A1 | 6/2010 | Rajagopalan et al. | |
| 2010/0167845 A1 | 7/2010 | Kim et al. | |
| 2010/0261551 A1* | 10/2010 | Felker et al. | 473/372 |
| 2011/0152450 A1 | 6/2011 | Kobayashi et al. | |

OTHER PUBLICATIONS

ChemSystems Report Abstract Styrene Block Copolymers; Feb. 2010; pp. 1-5.*
DOW "Amplity GR Functional Polymers" (Aug. 2010) The DOW Chemical Company.
http:/www.tech-white-papers.com/ (Feb. 17, 2010) DuPont Polymer Modifiers, "Polyamide Toughening Using DuPont Polymer Modifiers".

* cited by examiner

*Primary Examiner* — David Buttner
(74) *Attorney, Agent, or Firm* — Daniel W. Sullivan

(57) ABSTRACT

Multi-piece golf balls having at least one layer made from a polyamide non-ionomeric composition are provided. The polyamide composition consist essentially of about 40 to about 99% by weight polyamide; about 1 to about 60% by weight of an acid anhydride-modified polyolefin; and about 1 to about 60% of a fatty acid additive selected from the group consisting of fatty acid salts, fatty acid amides, and mixtures thereof. The ball includes a core, preferably a dual core construction; and a cover of at least one layer. A rubber composition is preferably used to form the inner core and the polyamide composition is preferably used to form the outer core layer. The resulting ball has high resiliency along with a soft feel.

13 Claims, 1 Drawing Sheet

GOLF BALL MATERIALS BASED ON BLENDS OF POLYAMIDE AND ACID ANHYDRIDE-MODIFIED POLYOLEFINS

BACKGROUND OF THE INVENTION

1. Field of the Invention

The present invention generally relates to multi-piece golf balls and more particularly to golf balls having at least one layer made of polyamide/acid anhydride-modified polyolefin compositions. The golf ball includes a core having at least one layer and a cover having at least one layer. Preferably, the ball contains a dual-core having an inner core and surrounding outer core layer or a multi-layered core having an inner core, intermediate core layer, and outer core layer. Preferably, at least one of the core layers is formed from a composition comprising a blend of polyamide and acid anhydride-modified polyolefin and fatty acid salt and/or amide.

2. Brief Review of the Related Art

Multi-piece, solid golf balls are used today by recreational and professional golfers. Basically, these golf balls contain an inner core protected by a cover. The core acts as the primary engine for the ball and the cover helps provide the ball with durability and wear-resistance. The core and cover may be single or multi-layered. For example, three-piece golf balls having an inner core, inner cover layer, and outer cover layer are popular. In other instances, golfers will use a four-piece ball containing a dual-core (inner core and surrounding outer-core layer) and dual-cover (inner cover layer and surrounding outer cover layer). Intermediate (casing) layer(s) may be disposed between the core and cover layers to impart various properties. Thus, five-piece and even six-piece balls can be made. Normally, the core layers are made of a natural or synthetic rubber material or highly neutralized ionomer polymers (HNPs). These ionomer polymers are typically copolymers of ethylene and methacrylic acid or acrylic acid that are partially or fully neutralized. Metal ions such as sodium, lithium, zinc, and magnesium are used to neutralize the acid groups in the copolymer.

Such ethylene acid copolymer ionomer resins are relatively hard materials having good durability, cut-resistance, and toughness. The ionomers may be used to make cover, intermediate, and core layers. When used as a core material, the hard ionomer resin helps impart a higher initial velocity to the golf ball. This is particularly advantageous for driver shots off the tee. The ball tends to have good flight distance. However, one disadvantageous feature of such balls is they tend to have a hard "feel." Some players experience a harsher, less comfortable feel when their club face makes contact with these hard balls. The player senses less control and the harder ball tends to have low initial spin. It is generally more difficult to hit hard balls with the proper touch and control. This can be particularly troublesome when making approach shots with irons near the green.

Thus, the industry has looked at numerous non-ionomeric materials such as polyolefins, polyamides, polyesters, polyurethanes, polyureas, fluoropolymers, polyvinyl chlorides, polycarbonates, polyethers, polyimides, and the like for making components and layers in golf balls. For example, Kim et al, US Patent Application Publication US 2010/0167845 discloses golf balls having a core, at least one intermediate layer, and at least one cover layer prepared from blends of polyamides with functional polymer modifiers of the polyamide. The functional modifier of the polyamide can include $\infty$-olefin copolymers or terpolymers having a glycidyl group, hydroxyl group, maleic anhydride group, or carboxylic group. The polyamide composition is preferably blended with a polyalkenamer rubber/functionalized organic modifier material.

Sullivan et al., U.S. Pat. No. 6,872,774 discloses a multi-layered golf ball having a core, intermediate layer, and cover. The intermediate layer is made of a composition comprising a non-ionomeric acid polymer and non-ionomeric stiffening polymer including blends of polyamides and polypropylene and polyethylene copolymers that have been grafted with maleic anhydride or sulfonate groups.

In Rajagopalan et al., U.S. Pat. No. 6,800,690 golf balls having at least one layer formed from a composition comprising a polyamide and non-ionomeric material including grafted or non-grafted metallocene-catalyzed olefinic polymers such as polyethylene and copolymers of ethylene are disclosed. The olefinic polymers may also contain functional groups such as epoxy, anhydride, amine, oxazoline, sulfonic acid, carboxylic acid, and their salts.

Although some non-ionomeric compositions containing polyamides as mentioned above may be somewhat effective for making certain components and layers in a golf ball, there is still a need for new compositions that can impart high quality performance properties to the ball. Particularly, there is a continuing need for improved core constructions in golf balls. The core material should have good toughness and provide the ball with high resiliency. The core material, however, should not be excessively hard and stiff so that properties such as feel, softness, and spin control are sacrificed. The present invention provides golf balls having an optimum combination of properties.

SUMMARY OF THE INVENTION

The present invention relates to multi-piece golf balls comprising a dual core having an inner core and surrounding outer core layer; and a cover having at least one layer disposed about the dual core. The inner core has an outer surface and geometric center, while the outer core layer has an outer surface and inner surface. In one preferred embodiment, the inner core comprises a rubber composition and the outer core layer consists essentially of a non-ionomeric composition. In particular, the non-ionomeric composition consists essentially of: i) about 40 to about 99% by weight polyamide; ii) about 1 to about 60% by weight of an acid anhydride-modified polyolefin; and iii) about 1 to about 60% of a fatty acid additive selected from the group consisting of fatty acid salts, fatty acid amides, and mixtures thereof. In one version, the geometric center of the inner core and surface of the outer core layer each has a hardness, and the surface hardness of the outer core layer is greater than the center hardness of the inner core.

Suitable polyamides include, for example, polyamide 6; polyamide 6,6; polyamide 6,10; polyamide 6,12; polyamide 11; polyamide 12; polyamide 6,9; and polyamide 4,6, and copolymers and blends thereof. Suitable acid anhydrides that can be used to functionalize the polyolefin polymer include, but are not limited to, maleic, fumaric, nadic, itaconic, and clorendic anhydrides, and their substituted derivatives thereof. In one preferred embodiment, the acid anhydride-modified polyolefin is an ethylene-based copolymer. For example, the ethylene copolymer may be selected from styrene-ethylene/butylene-styrene (SEBS); ethylene-propylene diene monomer (EPDM); ethylene-vinyl acetate (EVA); ethylene alkyl acrylate (EAA); ethylene alkyl methacrylate (EAMA) copolymers; and blends thereof. Propylene-based and butene-based copolymers also may be used.

In one version, a fatty acid salt is used in the composition. The metal cation for the fatty acid salt may be selected from the group consisting of zinc, sodium, lithium, potassium, calcium, magnesium, nickel, barium, manganese, copper, titanium, and aluminum. The fatty acid portion may be selected from the group consisting of stearic acid, nadic acid, erucic acid, linoleic acid, oleic acid, palmitic acid, and dimerized derivatives thereof, and mixtures thereof. In another version, a fatty acid amide is used in the composition. The fatty acid amide may be a primary monoamide such as, for example, stearamide, oleamide, erucamide, nadicamide, and palmitamide. In another version, substituted monoamides including, for example, lauryl oleamide, stearyl erucamide, hydroxy fatty acid amides, N-methylol fatty acid amides, and cocamide diethanolamide may be used. Bisamides are particularly preferred and include, for example, ethylene bis (stearamide) and methylene bis(oleamide). Mixtures of fatty acid salts and fatty acid amides also may be used.

The rubber composition may have a flex modulus of 1,000 to 60,000 psi; and the polyamide composition may have a flex modulus of 20,000 to 150,000 psi such that the flex modulus of the rubber material is less than the flex modulus of the polyamide material. As noted above, in one version, the surface hardness of the outer core layer is greater than the center hardness of the inner core; that is, the core has a positive hardness gradient. More particularly, in this version, the center hardness of the inner core is preferably about 15 Shore D or greater; and the surface hardness of the outer core layer is preferably about 40 Shore D or greater.

In a second preferred embodiment, the inner core consists essentially of the above-described non-ionomeric composition; and the outer core comprises a rubber composition. In this second version, the core also may have a positive hardness gradient, wherein the surface hardness of the outer core layer is greater than the center hardness of the inner core. In yet another embodiment, the cover of the golf ball comprises two or more layers and at least one of the cover layers consists essentially of the above-described non-ionomeric composition.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description in connection with the accompanying drawings in which:

DETAILED DESCRIPTION OF THE INVENTION

Figure 1:
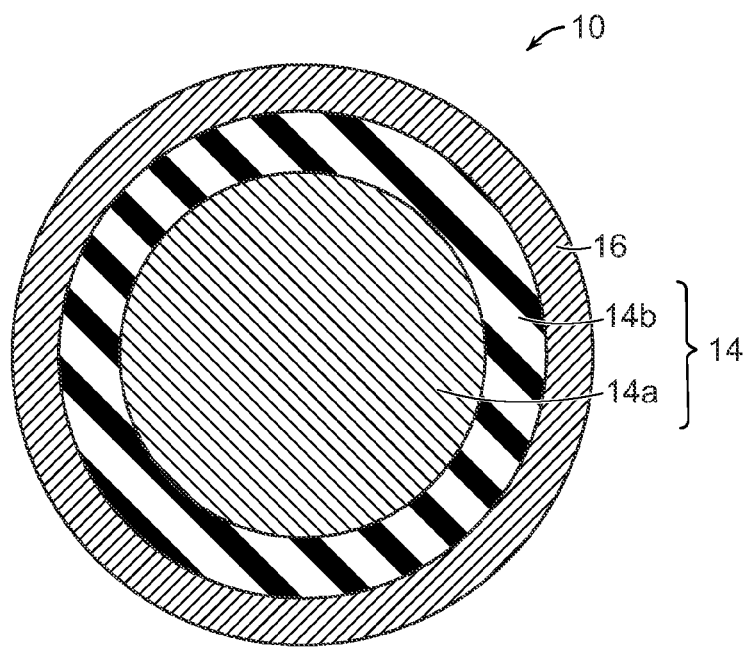
FIG. 1 is a cross-sectional view of a three-piece golf ball having a dual-core comprising an inner core/outer core, and a cover layer made in accordance with this invention.

The present invention relates generally to golf balls containing at least one component made from a non-ionomeric composition. In a particularly preferred version, a rubber composition is used to form an inner core; and a polyamide non-ionomeric composition is used to form an outer core layer. More particularly, the polyamide non-ionomeric composition consists essentially of: i) about 40 to about 99 weight percent of polyamide; ii) about 1 to about 60 weight percent of an acid anhydride-modified ethylene copolymer; and iii) about 1 to about 60 weight percent of fatty acid salt or fatty acid amide or mixtures thereof.

Golf balls having various constructions may be made in accordance with this invention. For example, golf balls having three-piece, four-piece, and five-piece constructions with single or multi-layered core, intermediate, and cover portions may be made. The term, "layer" as used herein means generally any spherical portion of the golf ball. More particularly, in one version, a three-piece golf ball having a dual-core and a cover is made. The dual-core includes an inner core (center) and surrounding outer core layer. In another version, a four-piece golf ball comprising a dual-core and dual-cover comprising an inner cover and outer cover is made. In yet another construction, a four-piece or five-piece golf ball having a multi-layered core comprising an inner core (center), intermediate core layer, and outer core layer, may be made. The golf balls of this invention may further contain an intermediate layer(s). As used herein, the term, "intermediate layer" means a layer of the ball disposed between the core and cover. The intermediate layer also may be referred to as a casing or mantle layer. The diameter and thickness of the different layers along with properties such as hardness and compression may vary depending upon the construction and desired playing performance properties of the golf ball.

Thermoplastic Polyamides

Thermoplastic polyamides are used to form the non-ionomeric compositions of this invention. The non-ionomeric composition consists essentially of polyamide; acid anhydride-modified polyolefin; and fatty acid additive as discussed further below. The composition may contain other ingredients that do not materially affect the basic and novel characteristics of the composition. For example, mineral fillers may be added to the composition as discussed further below.

In general, polyamides refer to high molecular weight polymers in which amide linkages (—CONH—) occur along the length of the molecular chain (*Hawley's Condensed Chemical Dictionary*, 13$^{th}$ Ed.). Suitable polyamides for use in the compositions of this invention may be obtained, for example, by: (1) polycondensation of (a) a dicarboxylic acid, such as oxalic acid, adipic acid, sebacic acid, terephthalic acid, isophthalic acid or 1,4-cyclohexanedicarboxylic acid, with (b) a diamine, such as ethylenediamine, tetramethylenediamine, pentamethylenediamine, hexamethylenediamine, or decamethylenediamine, 1,4-cyclohexyldiamine or m-xylylenediamine; (2) a ring-opening polymerization of cyclic lactam, such as ε-caprolactam or ω-laurolactam; (3) polycondensation of an aminocarboxylic acid, such as 6-aminocaproic acid, 9-aminononanoic acid, 11-aminoundecanoic acid or 12-aminododecanoic acid; or (4) copolymerization of a cyclic lactam with a dicarboxylic acid and a diamine. Specific examples of suitable polyamides include, but are not limited to, nylon 6, nylon 6,6; nylon 6,10; nylon 11, and nylon 12. Aliphatic and aromatic polyamides and blends thereof may be prepared in accordance with this invention.

Different commercially-available nylon resins may be used in accordance with the present invention including, but not limited to, Trimid® and Polyram® nylon 6,6 and nylon 6 resins, available from Polymer Technology & Services, LLC; Technyl® nylon 6,6 and nylon 6 resins, available from Rhodia Engineering Plastics; Ultramid® and Capron® nylon 6 resins, available from BASF; Cristamid® and Rilsan® nylon resins, available from Arkema Inc; Vestamid® nylon resins, available from Evonik Industries; Zytel® and Elvamide® nylon resins, available from the DuPont Company; and Grivory® GTR 45 and Grilamid® TR-90, transparent nylon resins, available from Grilamid® EMS.

Different grades of polyamides and their respective properties, which may be used in accordance with this invention, are described in the following Tables I, II, and III.

TABLE I

Polyamide Resins

| Property | Test Method | Units | Grade | | |
|---|---|---|---|---|---|
| | | | TRIMID N-66 100L | TECHNYL A205F | POLYRAM PA100 |
| Flexural Modulus | D790 | Kpsi | 410 | 421 | 392 |
| Tensile Strength, Ultimate | ISO 527 | Psi | | 8,700 | |
| Tensile Strength, Yield | D 638 | Psi | 12,000 | 12,300 | 12,300 |
| Elongation at Break | D638 | % | 50% | 25% | 4% |
| Elongation at Yield | ISO 527 | % | | 4% | |
| Izod impact | D256 | ft lb/in | 0.933 | 2.14 | 1.03 |
| Melting point | D3418 | °F. | 491 | 505 | 493 |

*TRIMID N-66 100L is a nylon 6,6 resin, available from Polymer Technology & Services, LLC.
*TECHNYL A205F is a nylon 6,6 resin, available from Rhodia Engineering Plastics.
*POLYRAM PA100 is a nylon 6,6 resin, available from Polymer Technology & Services, LLC.

TABLE II

Polyamide Resins

| Property | Test Method | Units | Grade | | |
|---|---|---|---|---|---|
| | | | ELVAMIDE 8061 | ELVAMIDE 8063 | ELVAMIDE 8066 |
| Flexural Modulus | D790 | Kpsi | 138 | 131 | |
| Tensile Strength | D 638 | Psi | 7,500 | 7,500 | 5,700 |
| Elongation at break | D638 | % | 320 | 315 | 370 |
| Izod impact | D256 | | | | |
| Melting point | D3418 | °F. | 313 | 316 | 239 |

*ELVAMIDE 8061, 8063, and 8066 are nylon multi-polymer resins, available from the DuPont Company.

TABLE III

Polyamide Resins

| Property | Test Method | Units | ZYTEL NC010 | ZYTEL BK431 |
|---|---|---|---|---|
| Flexural Modulus | D790 | Kpsi | 247 | 300 |
| Tensile Modulus | ISO 527 | Psi | 305,000 | 312,000 |
| Nominal Strain at Break | D638 | % | 10 | 14 |
| Izod impact | D256 | | | |
| Melting point | D3418 | °F. | 581 | 610-625 |

*ZYTEL NC010 and BK431 are nylon multi-polymer resins, available from the DuPont Company.

Polyamide homopolymers and copolymers are suitable for use in this invention. In general, polyamide homopolymers are produced by two common methods. In the first method, a compound containing one organic acid-type end group and one amine end group is formed into a cyclic monomer. The polyamide is then formed from the monomer by a ring-opening polymerization. These polyamides are commonly designated as nylon 6, nylon 11, nylon 12, and the like, where the number indicates the number of carbon atoms making up the ring in the monomer. For example, nylon 6 is a homopolymer of caprolactam, that is, polycaprolactam.

The second method involves the condensation polymerization of a dibasic acid and a diamine. In general, this reaction takes place as follows:

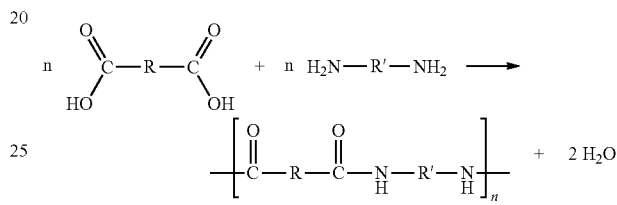

These polyamides are commonly designated as nylon 4,6; nylon 6,6; nylon 6,9; nylon 6,10; nylon 6,12; and the like, where the first number indicates the number of carbon atoms connecting the two amine groups in the diamine, and the second number indicates the number of carbon atoms connecting the two acid groups in the dibasic acid, including those in the acid groups. For example, nylon 6,6 is the reaction product of hexamethylenediamine and adipic acid.

Preferred polyamide homopolymers include nylon 4, nylon 6, nylon 7, nylon 11, nylon 12, nylon 13, nylon 4,6; nylon 6,6; nylon 6,9; nylon 6,10; nylon 6,12; nylon 12,12; nylon 13,13; and mixtures thereof. More preferred polyamide homopolymers include nylon 6, nylon 11, nylon 12, nylon 4,6; nylon 6,6; nylon 6,9; nylon 6,10; nylon 6,12; and mixtures thereof.

Compositions of nylon 6, nylon 6,6; nylon 11, and nylon 12 and copolymers and blends thereof are particularly effective in the present invention. More specifically, polyamide compositions having mechanical properties that do not significantly change after the composition has been exposed to moisture are particularly effective. These polyamide compositions can be used to form the outer core layer and protect the inner core from moisture. The outer core layer encapsulates the inner core so that fluids do not penetrate therein. Because the polyamide compositions are relatively stable, they are particularly effective for making outer core layers in accordance with this invention.

As discussed above, blends of polyamides also may be used in accordance with this invention. For example, a blend partially crystalline aliphatic polyamides and partially aromatic polyamides as disclosed in Liedloff et al., U.S. Pat. No. 7,348,046, the disclosure of which is hereby incorporated by reference, may be used. Another example of a group of suitable polyamides is thermoplastic polyamide elastomers. Thermoplastic polyamide elastomers typically are copolymers of a polyamide and polyester or polyether. For example, the thermoplastic polyamide elastomer can contain a polyamide (for example, nylon 6, nylon 6,6; nylon 11, nylon 12 and the like) as a hard segment and a polyether or polyester as a soft segment. In one specific example, the thermoplastic polyamides are amorphous copolyamides based on polyamide 12. Compositions of polyether-amide block copolymers, which are commonly known as Pebax® resins and are available from Arkema, Inc. (Columbs, France), are particularly effective.

Acid Anhydride-Modified Polyolefins

The term, "polymer" refers to, but is not limited to, oligomers, homopolymers, copolymers, terpolymers, and the like. The polymers may have various structures including, but not limited to, regular, irregular, alternating, periodic, random, block, graft, linear, branched, isotactic, syndiotactic, atactic, and the like.

The polyolefin polymer used to prepare the compositions of this invention is functionalized; it contains at least one acid anhydride group. That is, the polyolefin polymer is chemically modified (functionalized) with acid anhydride. In general, such acid anhydride groups may be grafted onto the polyolefin polymer backbone as discussed further below. Some examples of suitable acid anhydrides that may be used to functionalize the polyolefin include, but are not limited to, fumaric, nadic, itaconic, and clorendic anhydrides, and their substituted derivatives thereof.

The acid anhydride-modified polyolefin polymer is combined with a polyamide polymer and fatty acid salt and/or fatty acid amide to form a non-ionomeric composition that can be used to form various components (layers) in a golf ball as discussed further below. Thus, the acid-anhydride polyolefin polymer also is non-ionomeric. As discussed above, ionomer acid copolymers, typically copolymers of ethylene and methacrylic acid or acrylic acid that are partially or fully neutralized are often used in compositions for golf balls, but the compositions of the present invention do not contain such ionomer acid copolymers.

Suitable olefin monomeric units that can be used to prepare the polyolefin polymer include, for example, ethylene, propylene, butene, hexene, heptene, octene, decene, and dodecene. Preferably, the monomeric unit contains from 2 to about 20 carbon atoms. The resulting polyolefin chains (polymer backbones) formed from these monomeric units include, for example, polyethylene, high density polyethylene (HDPE), low density polyethylene (LDPE), very low density polyethylene (VLDPE), polypropylene, polybutene, polyhexene, polyoctene, polydecene, and polydodecene, and copolymers and blends thereof. The resulting polyolefin polymer is functionalized with at least one acid anhydride moiety as discussed above.

More particularly, the acid anhydride-modified polyolefin polymers used in this invention include copolymers such as, for example, ethylene-based copolymers, particularly ethylene-propylene (EP); ethylene-butene (EB); ethylene-hexene (EH); ethylene-octene (EO); styrene-ethylene/butylene-styrene (SEBS); ethylene-propylene diene monomer (EPDM); ethylene-vinyl acetate (EVA); and various ethylene-alkyl acrylate and ethylene-alkyl alkyl acrylate copolymers such as, for example, ethylene-methyl acrylate (EMA); ethylene-ethyl acrylate (EEA); ethylene-propyl acrylate (EPA); ethylene n-butyl acrylate (EBA) copolymers; and the like. Other polyolefin-based copolymers such as polypropylene and polybutene-based copolymers also can be used. These copolymers include random, block, and graft copolymers which have been functionalized with acid anhydride groups.

The acid anhydride-modified polyolefin polymers can be prepared using techniques known in the art. For example, polyolefin copolymers, which are formed using metallocene single-site catalysts (or other single-site catalysts), can be used. These polyolefin copolymers can be formed by copolymerizing ethylene (or other olefin monomeric unit) with a functionalized comonomer(s) such as propene, butene, hexene, or octene containing acid anhydride groups under high pressure in the presence of metallocene or other single-site catalysts. In other instances, the ethylene (or other comonomeric unit) containing the acid anhydride groups may be grafted onto a metallocene catalyzed polyolefin polymers such as polypropylene, polyethylene, or polybutylene; or olefin copolymers of propylene, butylene, hexylene, heptylene, octylene and the like. Different grafting techniques known in the art for synthesizing grafted copolymers can be used. Examples of metallocene catalysts include ferrocene, cobaltocene, nickelocene, titanocene dichloride, and zirconocene dichloride. These metallocene catalyzed polymers have some advantages over non metallocene-catalyzed polymers including a more narrowly defined molecular weight distribution and more uniform molecular architecture.

Examples of commercially-available acid anhydride polyolefins that can be used in accordance with this invention, include, but are not limited to, Amplify™ GR functional polymers, available from the Dow Chemical Company; Fusabond® polymers, available from the DuPont Company; Kraton® FG and RP polymers, available from Kraton Polymers LLC; Lotader® polymers available from Arkema, Inc.; Polybond® and Royaltuf® polymers, available from Chemtura Corp.; and Exxelor polymers available from the ExxonMobil Corp. Some examples of commercially-available acid anhydride-modified polyolefins that may be used in accordance with this invention, are described in the following Table IV.

TABLE IV

Acid-Anhydride Modified Polyolefins

| Trade Name | Polymer | Hardness | Flex | Copolymer and/or Grafted Species and Level | Density |
|---|---|---|---|---|---|
| Amplify GR202 | LDPE | 51D | 35 ksi-2% sec | MA > 1.0% | 0.928 |
| Amplify GR204 | ethylene-hexene | 64D | 114 ksi-2% sec | MA > 1.0% | 0.954 |
| Amplify GR205 | ethylene | 67D | 134 ksi-2% sec | MA > 1.0% | 0.960 |
| Amplify GR208 | ethylene-butene | 36D | 13 ksi-2% sec | MA > 1.0% | 0.902 |
| Amplify GR216 | ethylene-octene | 21D | 2 ksi-2% sec | MA > 0.5% | 0.875 |
| Fusabond 525D | Metallocene PE | | | MA | 0.880 |
| Fusabond A560 | Ethylene-Butyl Acrylate | | | BuAcr/MA | 0.930 |
| Fusabond C190 | EVA | | | MA | 0.950 |
| Fusabond E100 | HDPE | | | MA | 0.954 |
| Fusabond E528 | PE | | | MA | |
| Fusabond M603 | Random Et | | | MA | 0.940 |
| Fusabond N416 | Et Elastomer | | | MA | 0.869 |

TABLE IV-continued

Acid-Anhydride Modified Polyolefins

| Trade Name | Polymer | Hardness | Flex | Copolymer and/or Grafted Species and Level | Density |
|---|---|---|---|---|---|
| Fusabond P353 | PP | | | MA | 0.904 |
| Kraton FG1901GT | SEBS | 71A | | MA-1.4-2.0% | 0.910 |
| Kraton FG1924GT | SEBS | 49A | | MA-0.7-1.3% | 0.900 |
| Lotader 4210 | Ethylene-Butyl Acrylate | 44D | 17 ksi | BuAcr-6.5%/MA-3.6% | 0.940 |
| Lotader 4603 | Ethylene-Methyl Acrylate | 76A | 1.3 ksi | MeA-26%/MA-0.3% | 0.950 |
| Lotader 4700 | Ethylene-Ethyl Acrylate | 14D | <4.3 ksi | EA-29%/MA-1.3% | 0.940 |
| Polybond 3009 | HDPE | | 95 ksi | MA-1.0% | 0.950 |
| Polybond 3150 | PP | | 189 ksi | MA | |
| Royaltuf 485 | EPDM (norbornene) | | | MA-0.5% | |
| Exxelor PE 1040 | HDPE | | | MA-0.5-1.0% | 0.960 |
| Exxelor PO 1015 | PP | | | MA-0.25-0.5% | 0.900 |
| Exxelor VA 1202 | ethylene-octene | | | MA-0.5-1.0% | 0.900 |
| Exxelor VA 1801 | EP | | | MA-0.5-1.0% | 0.880 |

Amplify ™ functional polymers are available from the Dow Chemical Company
Fusabond ® resins are available from the DuPont Company
Kraton ® polymers are available from the Kraton Polymers U.S. LLC
Lotader ® polymers are available from Arkema, Inc.
Polybond ® and Royaltuf ® polymers are available from Chemtura Corp.
Exxelor ™ polymers are available from the ExxonMobil Corporation.
*The information set forth in above Table IV was provided in technical data sheets made available by the various commercial suppliers.

In accordance with the present invention, the acid anhydride-modified polyolefin polymer is combined with a polyamide polymer and fatty acid salt and/or fatty acid amide. The resulting non-ionomeric composition may be used to prepare a dual-core having several advantageous properties. In particular, the dual-core helps provide the golf ball with good resiliency (distance) without sacrificing a nice feel to the ball. As discussed above, some polyamides may have a relatively high flex modulus and golf ball layers made from such a polyamide, by and in itself, can be overly stiff and brittle. If this layer is too stiff, the golf ball may have a hard "feel." Now, it has been found that polyamide compositions consisting essentially of polyamide and acid anhydride-modified polyolefin and certain fatty acid additives can be used to form a golf ball layer having an optimum combination of properties. Particularly, the polyamide composition may be used as a material for constructing the core of the golf ball.

While not wishing to be bound by any theory, it is believed that adding the acid anhydride-modified polyolefin helps improve the toughness and impact durability of the polyamide. Furthermore, it is believed that adding the fatty acid salt and/or fatty acid amide may at least partially disrupt the crystallinity of the polyamide polymer chains. By partially reducing the crystallinity of the polyamide, it becomes softer and more rubbery. Thus, the final polyamide composition is relatively tough, but not overly hard and stiff, and it can be used to form various layers in the golf ball.

Particularly, in one embodiment, it is used to form an outer core layer that surrounds the inner core (center) of the ball and imparts both toughness and a softer compression feel to the core structure. The resulting ball has a relatively high coefficient of restitution (COR) allowing it to reach high velocity when struck by a golf club. Thus, the ball tends to travel a greater distance which is particularly important for driver shots off the tee. At the same time, the ball has a relatively soft and comfortable feel to it. The golfer experiences a better sense of control and more natural feeling when striking the ball. In general, the cores of this invention typically have a COR of about 0.75 or greater; and preferably about 0.80 or greater. Meanwhile, the compression of the dual-core (inner core (center) and surrounding outer core layer) is preferably within the range of about 30 to about 110, more preferably within the range of about 50 to about 100, and even more preferably within the range of about 70 to about 90.

Functionalized polyolefin polymers, other than the above-described acid anhydride-modified polyolefins, can be used in the polyamide compositions of this invention. The term, "functionalized polyolefin polymers," refers to polymers comprising at least one olefinic monomer, and may further include co-monomers including (meth)acrylate esters, styrenes, and dienes. The polymer or copolymer is typically functionalized by reactively grafting a structurally distinct side chain onto the main polymer chain, but may in some cases be a product of copolymerization with the co-monomers. Examples of grafted species include, but are not limited to, unsaturated alkyl diacids and anhydrides such as maleic, fumaric, and itaconic acids and anhydrides as well as their esters, (meth)acrylic acids and (meth)acrylate esters (including glycidyl methacrylates), The grafted species will most often contain a polar functional group. Desirable polar groups in the grafted species include, but are not limited to, carboxylic acids, carboxylic acid anhydrides, glycidyls, glycidyl ethers, epoxies, amines, amides, sulfates, sulfonates, sulfonamides, oxazolines, phosphates, halogens, thiols, and hydroxyls.

Fatty Acid Salts

The composition further contains a fatty acid additive selected from the group consisting of fatty acid salts, fatty acid amides, and mixtures thereof. In general, the fatty acid salt comprises an aliphatic chain having a COOH group (fatty acid) and a cation source (normally a metal salt). The aliphatic chain may be either saturated or unsaturated, and linear or branched. The fatty acid salts of this invention do not include reactive cross-linking agents or co-agents such as, for example, zinc and magnesium salts of fatty acids having 3 to 8 carbon atoms such as acrylic acid, methacrylic acid, and maleic acid, which are often used in rubber compositions for golf ball constructions. The fatty acid salt may be commercially-available in solid, semi-solid or liquid form.

Examples of suitable saturated fatty acids, that is, fatty acids in which the carbon atoms of the alkyl chain are connected by single bonds, include but are not limited to butyric acid (chain length of $C_4$ and molecular weight of 88.1); capric acid ($C_{10}$ and MW of 172.3); lauric acid ($C_{12}$ and MW of 200.3); myristic acid ($C_{14}$ and MW of 228.4); palmitic acid ($C_{16}$ and MW of 256.4); stearic acid ($C_{18}$ and MW of 284.5); and behenic acid ($C_{22}$ and MW of 340.6). Examples of suitable unsaturated fatty acids, that is, a fatty acid in which there is one or more double bonds between the carbon atoms in the alkyl chain, include but are not limited to oleic acid (chain length and unsaturation C18:1; and MW of 282.5); linoleic acid (C18:2 and MW of 280.5; linolenic acid (C18:3 and MW of 278.4); and erucic acid (C22:1 and MW of 338.6).

The source of the metal cations used to produce the metal salts of the fatty acids is generally selected from various metal salts such as, for example, the sulfate, carbonate, acetate, acetyl acetonate, and hydroxide salts of metals such as barium, lithium, sodium, zinc, bismuth, chromium, cobalt, copper, potassium, manganese, strontium, titanium, tungsten, magnesium, cesium, iron, nickel, silver, aluminum, tin, or calcium, and blends thereof. These metal salts provide the cations capable of neutralizing (at varying levels) the carboxylic acid groups of the fatty acids.

Suitable fatty acid salts include, for example, metal stearates, erucates, laurates, oleates, palmitates, pelargonates, and the like. For example, fatty acid salts such as zinc stearate, calcium stearate, magnesium stearate, barium stearate, and the like can be used. It is preferred the fatty acid salts be relatively non-migratory (they do not bloom to the surface of the polymer under ambient temperatures) and non-volatile (they do not volatilize at temperatures (required for melt-blending).

Fatty Acid Amides

In general, fatty acid amides contain a saturated or unsaturated alkyl chain derived from a fatty acid and can be generally classified as falling within one of the following three categories. The first is primary monoamides having the general chemical structure:

wherein R is a fatty alkyl or alkenyl chain of $C_8$-$C_{22}$ and R'=R"=H. Examples of primary monoamides include, but are not limited to stearamide, oleamide, erucamide, behenamide, and palmitamide The second is substituted monoamides having the general chemical structure:

These substituted monoamides include secondary, tertiary, and alkanolamides, wherein R is a fatty alkyl or alkenyl chain of $C_5$-$C_{23}$; and R' and R" may be a hydrogen, fatty alkyl, alkenyl, aryl, or alkylene oxide condensation groups with at least one alkyl, alkenyl, aryl, or alkylene oxide group. Examples of substituted monoamides include, but are not limited to, lauryl oleamide, stearyl erucamide, hydroxy fatty acid amides, N-methylol fatty acid amides, and cocamide diethanolamide.

The third category is bisamides having the general chemical structure:

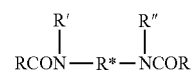

wherein, the R groups are fatty alkyl or alkenyl chains. R* is a methylene or ethylene group, and R' and R" may be hydrogen, fatty alkyl, alkylene, aryl, or alkylene oxide condensation groups. Examples of suitable bisamides include, but are not limited, to ethylene bis(stearamide) and methylene bis (oleamide). R could also be a hydroxy fatty acid in any of the above three categories.

Many polyamides are semi-crystalline thermoplastic polymers containing amorphous and crystalline regions. The amorphous regions contribute elasticity and the crystalline regions contribute strength and rigidity to the polymer. The polar amide groups in the backbone chains of the polyamide polymer are attracted to each other. These groups form strong hydrogen bonds between the chains, thus providing a crystalline network. In other instances, the polyamides have a fully amorphous or crystalline nature. It is also recognized that blends of amorphous polyamides and semi-crystalline polyamides may be prepared and used in accordance with this invention. For example, such amorphous/semi-crystalline polyamide blends, which may further contain toughening agents as disclosed in Epstein et al., U.S. Pat. No. 4,410,661, the disclosure of which is hereby incorporated by reference, may be used.

While not wishing to be bound by any theory, it is believed that adding the fatty acid salt and/or fatty acid amide ("fatty acid additives") may at least partially disrupt the crystallinity of the polyamide chains. Particularly, the fatty acid additives may be added in a sufficient amount so that it partially reduces the crystallinity of the polyamide. Preferably, the crystallinity of the polyamide is reduced by at least 1%. That is, the first polyamide (containing polyamide only) composition has a first percentage of crystallinity and the second polyamide composition (containing polyamide/acid-anhydride modified polyolefin/fatty acid additive) has a second percentage of crystallinity. In a preferred embodiment, the second crystallinity percent value is at least 1% less; or at least 2% less; or at least 4% less; or at least 8% less; or at least 10% less than the first crystallinity percent value. The crystallinity of the polyamide may be determined by conventional techniques such as differential scanning calorimetry which measures the amount of heat absorbed or released by the sample as the sample undergoes a physical transformation. Determining the crystallinity of polyamide 6 and polyamide 6,6 is particularly effective and such polyamides can be used in accordance with this invention. By partially reducing the crystallinity of the polyamide, it becomes softer and more rubbery. Since the polyamide is less hard and stiff, it can be used to form the outer core layer and help impart a softer compression to the core. The compression of the dual-core (inner core (center) and surrounding outer core layer) is preferably within the range of about 30 to about 110, more preferably within the range of about 50 to about 100, and even more preferably within the range of about 70 to about 90.

It is believed that the fatty acid additive should be added in a sufficient amount to the polyamide composition so there is a substantial change in the crystallinity of the polyamide polymer. Thus, although the concentration of fatty acid additive may be as little as 1% by weight to form some polyamide compositions per this invention, it is preferred that the concentration be relatively greater.

For example, it is preferred that the concentration of fatty acid salt be at least 6 wt. %, more preferably at least 12 wt. %, and even more preferably at least 18 wt. % based on total weight of the composition. More particularly, it is preferred that the fatty acid salt be present in an amount within a range having a lower limit of 6% or 12% or 18% or 20% or 25% or 30% or 35% and an upper limit of 40% or 45% or 50% or 55% or 60%. In one preferred embodiment, the concentration of fatty acid salt falls within the range of about 20% to about 45%.

In a similar manner, it is preferred that the concentration of fatty acid amide be at least 5 wt. %, more preferably at least 8 wt. %, and even more preferably at least 11 wt. % based on total weight of the composition. More particularly, it is preferred that the fatty acid amide be present in an amount within a range having a lower limit of 5% or 8% or 11% or 15% or 18% or 20% and an upper limit of 22% or 25% or 30% or 40% or 50% or 60%. In one preferred embodiment, the concentration of fatty acid amide falls within the range of about 5% to about 25%.

In the present invention, it is preferred that the fatty acid salt and/or fatty acid amide be present at relatively high concentrations to cause the crystallinity of the polyamide polymer to change substantially. This helps impart some advantageous properties to the composition making it particularly effective for use in a golf ball construction.

Flex Modulus and Hardness of Composition

As discussed above, in one preferred version, the polyamide non-ionomeric composition is used to form an outer core and a rubber composition is used to form an inner core. In one embodiment, the polyamide composition is relatively stiff and the rubber composition is relatively flexible. That is, in one embodiment, the flex modulus and hardness of the polyamide material is greater than the flex modulus and hardness of the rubber material.

More particularly, in one embodiment, the polyamide composition has a flex modulus lower limit of 20,000 or 30,000 or 40,000 or 50,000 or 60,000 or 70,000 or 80,000 or 90,000 or 100,000; and a flex modulus upper limit of 110,000 or 120,000 or 130,000 psi or 140,000 or 160,000 or 180,000 or 200,000 or 300,000 or 400,000 or 500,000 psi or greater. In general, the properties of flex modulus and hardness are related, whereby flex modulus measures the material's resistance to bending and hardness measures the material's resistance to indentation. In general, as the flex modulus of the material increases, the hardness of the material also increases. Thus, in one embodiment, the polyamide composition is relatively hard having a hardness of 40 Shore D or greater, or 50 Shore D or greater, or 60 Shore D or greater, or within a range having a lower limit of 40 or 50 or 60 Shore D and an upper limit of 80 or 90 or 100 Shore D.

As discussed above, it is believed that adding the fatty acid additive to the polyamide helps make the composition softer and more rubbery (although the polyamide/acid anhydride-modified polyolefin/fatty acid additive composition is still considered relatively stiff versus the rubber composition.) Thus, in one embodiment, the first polyamide (containing polyamide only) composition has a first flex modulus value and the second polyamide (containing polyamide/acid-anhydride modified polyolefin/fatty acid additive) composition has a second flex modulus value, wherein the second flex modulus value is at least 1% less; or at least 2% less; or at least 4% less; or at least 8% less; or at least 10% less than the first modulus value.

Conversely, in one preferred version, the rubber composition is relatively flexible. More particularly, in one embodiment, the rubber composition has a flex modulus lower limit of 1,000 or 5,000 or 10,000 or 15,000 or 20,000 or 25,000 or 30,000 psi and an upper limit of 40,000 or 45,000 or 50,000 or 60,000 or 70,000 or 80,000 psi. As discussed above, the hardness and flex modulus of the material are generally related and as the hardness of the material decreases, the flex modulus of the material also decreases. Thus, in one embodiment, the rubber composition has a hardness of 30 Shore D or less; or 40 Shore D or less; or 50 Shore D or less; or 60 Shore D or less. In another embodiment, the hardness of the rubber composition falls within a range having a lower limit of 15 or 30 or 40 or 50 Shore D and an upper limit of 60 or 70 or 80 or 85 Shore D.

Test methods for measuring the flex modulus and hardness of the materials are described further below. In some instances, it may be more feasible to measure the hardness of the golf ball layer (that is, "hardness on the ball"), and this test method also is described below.

By the term, "modulus" as used herein, it is meant flexural modulus which is the ratio of stress to strain within the elastic limit (when measured in the flexural mode) and is similar to tensile modulus. This property is used to indicate the bending stiffness of a material. The flexural modulus, which is a modulus of elasticity, is determined by calculating the slope of the linear portion of the stress-strain curve during the bending test. The formula used to calculate the flexural modulus from the recorded load (F) and deflection (D) is:

$$E_B = \frac{3}{4} \frac{FL^3}{bd^3 D}$$

wherein,
L=span of specimen between supports (m);
b=width (m); and
d=thickness (m)

If the slope of the stress-strain curve is relatively steep, the material has a relatively high flexural modulus meaning the material resists deformation. The material is more rigid. If the slope is relatively flat, the material has a relatively low flexural modulus meaning the material is more easily deformed. The material is more flexible. Flexural modulus can be determined in accordance with ASTM D790 standard among other testing procedures.

Additives and Fillers

A wide variety of additives and fillers may be included in the final thermoplastic polyamide non-ionomeric composition. Suitable additives and mineral fillers include, for example, precipitated hydrated silica, clay, talc, asbestos, glass fibers, aramid fibers, mica, calcium metasilicate, barium sulfate, zinc sulfide, lithopone, silicates, silicon carbide, diatomaceous earth, polyvinyl chloride, carbonates such as calcium carbonate and magnesium carbonate. Suitable metal fillers include titanium, tungsten, aluminum, bismuth, nickel, molybdenum, iron, lead, copper, boron, cobalt, beryllium, zinc, and tin. Suitable metal alloys include steel, brass, bronze, boron carbide whiskers, and tungsten carbide whiskers. Suitable metal oxide fillers include zinc oxide, iron oxide, aluminum oxide, titanium dioxide, magnesium oxide, and zirconium oxide. Suitable particulate carbonaceous fillers include graphite, carbon black, cotton flock, natural bitumen, cellulose flock, and leather fiber. Micro balloon fillers such as glass and ceramic, and fly ash fillers can also be used.

Other additives and fillers include, but are not limited to, chemical blowing and foaming agents, optical brighteners, coloring agents, fluorescent agents, whitening agents, ultraviolet (UV) light absorbers, UV light stabilizers, defoaming agents, processing aids, antioxidants, stabilizers, softening agents, fragrance components, plasticizers, and impact modifiers. In a particular embodiment, the total amount of additive(s) and filler(s) present in the polyamide composition is 25 wt. % or less, 20 wt. % or less, 15 wt. % or less, or 12 wt. % or less, or 10 wt. % or less, or 9 wt. % or less, or 6 wt. % or less, or 5 wt. % or less, or 4 wt. % or less, or 3 wt. % or less, based on the total weight of the polyamide composition. More particularly, the polyamide composition may include filler(s) selected from carbon black, nanoclays (e.g., Cloisite® and Nanofil® nanoclays, commercially available from Southern Clay Products, Inc., and Nanomax® and Nanomer® nanoclays, commercially available from Nanocor, Inc.), talc (e.g., Luzenac HAR® high aspect ratio talcs, commercially available from Luzenac America, Inc.), glass (e.g., glass flake, milled glass, and microglass), mica and mica-based pigments (e.g., Iriodin® pearl luster pigments, commercially available from The Merck Group), and combinations thereof. Organic fiber micropulp also may be added. Polyamide-clay nanocomposites such as an amorphous polyamide resin containing a clay material uniformly dispersed therein, as disclosed in Lan et al., U.S. Pat. No. 6,376,591 also may be used in the polyamide composition. In another version, the polyamide compositions may contain carbon fibers or carbon fiber sheets comprising a weave of thin carbon fibers held together in a resin.

Core Structure

As discussed above, the core is preferably a dual-core comprising an inner core (center) made from a rubber composition and a surrounding outer core layer made from the polyamide non-ionomeric composition of this invention.

Any suitable rubber composition known in the art may be used to make the inner core (center) of the ball in accordance with this invention. In general, such rubber compositions contain a base rubber, free-radical initiators, crosslinking agents, and filler. Suitable base rubbers include, for example, polybutadiene, ethylene-propylene rubber, ethylene-propylene-diene rubber, polyisoprene, styrene-butadiene rubber, polyalkenamers, butyl rubber, halobutyl rubber, or polystyrene elastomers.

Examples of commercially-available polybutadiene rubbers that can be used in accordance with this invention, include, but are not limited to, BR 01 and BR 1220, available from BST Elastomers of Bangkok, Thailand; SE BR 1220LA and SE BR1203, available from DOW Chemical Co of Midland, Mich.; BUDENE 1207, 1207s, 1208, and 1280 available from Goodyear, Inc. of Akron, Ohio; BR 01, 51 and 730, available from Japan Synthetic Rubber (JSR) of Tokyo, Japan; BUNA CB 21, CB 22, CB 23, CB 24, CB 25, CB 29 MES, CB 60, CB Nd 60, CB 55 NF, CB 70 B, CB KA 8967, and CB 1221, available from Lanxess Corp. of Pittsburgh. Pa.; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEOCIS BR 60, INTENE 60 AF and P30AF, and EUROPRENE BR HV80, available from Polimeri Europa of Rome, Italy; AFDENE 50 and NEODENE BR40, BR45, BR50 and BR60, available from Karbochem (PTY) Ltd. of Bruma, South Africa; KBR 01, NdBr 40, NdBR-45, NdBR 60, KBR 710S, KBR 710H, and KBR 750, available from Kumho Petrochemical Co., Ltd. Of Seoul, South Korea; DIENE 55NF, 70AC, and 320 AC, available from Firestone Polymers of Akron, Ohio; and PBR-Nd Group II and Group III, available from Nizhnekamskneftekhim, Inc. of Nizhnekamsk, Tartarstan Republic.

The rubber compositions of this invention may be cured, either by pre-blending or post-blending, using conventional curing processes. Suitable curing processes include, for example, peroxide-curing, sulfur-curing, high-energy radiation, and combinations thereof. Preferably, the rubber composition contains a free-radical initiator selected from organic peroxides, high energy radiation sources capable of generating free-radicals, and combinations thereof. In one preferred version, the rubber composition is peroxide-cured. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel.

Radical scavengers such as a halogenated organosulfur or metal salt thereof, organic disulfide, or inorganic disulfide compounds may be added to the rubber composition. These compounds also may function as "soft and fast agents." As used herein, "soft and fast agent" means any compound or a blend thereof that is capable of making a core: 1) softer (having a lower compression) at a constant "coefficient of restitution" (COR); and/or 2) faster (having a higher COR at equal compression), when compared to a core equivalently prepared without a soft and fast agent. Preferred halogenated organosulfur compounds include, but are not limited to, pentachlorothiophenol (PCTP) and salts of PCTP such as zinc pentachlorothiophenol (ZnPCTP). Using PCTP and ZnPCTP in golf ball inner cores helps produce softer and faster inner cores. The PCTP and ZnPCTP compounds help increase the resiliency and the coefficient of restitution of the core. In a particular embodiment, the soft and fast agent is selected from ZnPCTP, PCTP, ditolyl disulfide, diphenyl disulfide, dixylyl disulfide, 2-nitroresorcinol, and combinations thereof.

The rubber compositions of the present invention also may include fillers, which are added to adjust the density and/or specific gravity of the material. Suitable fillers include, but are not limited to, polymeric or mineral fillers, metal fillers, metal alloy fillers, metal oxide fillers and carbonaceous fillers. The fillers can be in any suitable form including, but not limited to, flakes, fibers, whiskers, fibrils, plates, particles, and powders. Rubber regrind, which is ground, recycled rubber material (for example, ground to about 30 mesh particle size) obtained from discarded rubber golf ball cores, also can be used as a filler. The amount and type of fillers utilized are governed by the amount and weight of other ingredients in the golf ball, since a maximum golf ball weight of 45.93 g (1.62 ounces) has been established by the United States Golf Association (USGA).

Preferably, the base rubber material is polybutadiene rubber, and this material may be blended with other elastomers in accordance with this invention. Other elastomers include, but are not limited to, polybutadiene, polyisoprene, ethylene propylene rubber ("EPR"), styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof.

The rubber compositions also preferably include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particular examples of suitable metal salts include, but are not limited to, one or more metal salts of acrylates, diacrylates, methacrylates, and dimethacrylates, wherein the metal is selected from magnesium, calcium, zinc, aluminum, lithium, and nickel. In a particular embodiment, the co-agent is selected from zinc salts of acrylates, diacrylates, methacrylates, and dimethacrylates. In another particular embodiment, the agent is zinc diacrylate (ZDA).

In one version, the surface hardness of the outer core layer (polyamide/acid anhydride-modified polyolefin/fatty acid additive composition) is greater than the center hardness of the inner core (rubber composition). That is, the core structure has a "positive" hardness gradient as discussed further below. Preferably, the inner core has a center hardness (CH) within a range having a lower limit of 15 or 25 or 30 or 35 or 40 or 45 or 50 or 55 Shore D and an upper limit of 60 or 65 or 70 or 75 or 80 or 85 or 90 Shore D. The inner core (center) also preferably has a surface hardness (ICSH) within a range having a lower limit of 15 or 20 or 30 or 35 or 40 or 45 or 50 or 55 Shore D and an upper limit of 60 or 65 or 70 or 75 or 80 or 85 or 90 Shore D. Meanwhile, the outer core layer preferably has a surface hardness (OCLSH) within a range having a lower limit of 40 or 45 or 50 or 55 Shore D and an upper limit of 60 or 65 or 70 or 75 or 80 or 85 or 90 Shore D. In an alternative version, the polyamide/acid anhydride-modified polyolefin/fatty acid additive composition is used to form the inner core, while the rubber composition is used to form the outer core. In one instance, the surface hardness of the outer core layer (rubber-containing) is greater than the center hardness of the inner core (polyamide-containing). That is, the core structure has a positive hardness gradient as discussed further below. In another instance, the center hardness of the inner core (polyamide-containing) is greater than the surface hardness of the outer core layer (rubber-containing). That is, the core structure has a "negative" hardness gradient as discussed further below.

Particularly, in one preferred instance, the center hardness of the inner core is in the range of about 15 to about 82 Shore D and the surface hardness of the outer core is in the range of about 40 to about 87 Shore D. More preferably, the center hardness of the inner core is about 15 Shore D or greater and the surface hardness of the outer core is about 50 Shore D or greater. In these instances, the surface hardness (outer core) is preferably at least 5 Shore D greater than the center hardness (inner core).

As discussed above, in another instance, the center hardness of the inner core is greater than the surface hardness of the outer core layer. For example, the center hardness may be about 50 Shore D units or greater and the surface hardness of the outer core may be about 15 Shore D units or greater. In these instances, the center hardness (inner core) is preferably at least 5 Shore D units greater than the surface hardness (outer core).

In one preferred golf ball, the inner core (center) has a "positive" hardness gradient (that is, the outer surface of the inner core is harder than its geometric center) and the outer core layer has a "positive" hardness gradient (that is, the outer surface of the outer core layer is harder than the inner surface of the outer core layer.) In cases where both the inner core and outer core layer have "positive" hardness gradients, the outer surface hardness of the outer core layer is still preferably greater than the material hardness of the inner core (center).

In another version, the inner core (center) has a positive hardness gradient, while the outer core layer has a "negative" hardness gradient (that is, the outer surface of the outer core layer is softer than the inner surface of the outer core layer.) In yet another version, the outer core layer may have a "zero" hardness gradient. (That is, the hardness values of the outer surface of the outer core layer and the inner surface of the outer core layer are substantially the same.) Particularly, the term, "zero hardness gradient" as used herein, means a surface to center (or second surface) Shore C hardness gradient of less than 8, preferably less than 5 and most preferably less than 3 and may have a value of zero or negative 1 to negative 25. The term, "negative hardness gradient" as used herein, means a surface to center (or second surface) Shore C hardness gradient of less than zero. The terms, "zero hardness gradient" and "negative hardness gradient," may be used herein interchangeably to refer to hardness gradients of negative 1 to negative 25. The term, "positive hardness gradient" as used herein, means a surface to center (or second surface) Shore C hardness gradient of 8 or greater, preferably 10 or greater, and most preferably 20 or greater. By the term, "steep positive hardness gradient" as used herein, it is meant surface to center (or second surface) Shore C hardness gradient of 20 or greater, more preferably 25 or greater, and most preferably 30 or greater. For example, the core may have a steep positive hardness gradient of 35, 40, or 45 Shore C or greater.

In one particular version, the hardness gradient from the geometric center of the inner core to the surface of the outer core layer is a positive hardness gradient. That is, the outer surface of the outer core layer is harder than the center of the inner core. Methods for measuring the hardness of the core and cover layers and determining the hardness gradients are discussed in further detail below.

As discussed above, the dual-core constitutes an inner core (center) and an outer core layer. The inner core preferably has a diameter within a range having a lower limit of 0.125 or 0.130 or 0.140 or 0.150 or 0.20 or 0.40 or 0.80 inches and an upper limit of 1.125 or 1.20 or 1.40 or 1.50 or 1.55 inches. More preferably, the inner core has a diameter in the range of about 0.125 to about 1.50 inches. The outer core preferably has a thickness within a range having a lower limit of 0.010 or 0.020 or 0.025 or 0.030 or 0.035 or 0.040 inches and an upper limit of 0.070 or 0.080 or 0.090 or 0.100 or 0.120 or 0.140 or 0.300 or 0.400 or 0.500 or 0.600 or 0.700 inches. Particularly, the outer core layer may have a thickness in the range of about 0.010 to about 0.570 inches and more preferably in the range of about 0.020 to about 0.280 inches. In other embodiments, particularly when the polyamide composition is used to form the inner core, the inner core may be smaller. For example, the inner core may have a diameter in the range of about 0.050 to about 1.40 inches, more preferably about 0.100 to about 0.700 inches. In such cases, the outer core layer may have a thickness in the range of about 0.020 to about 0.650 inches. The outer core layer encloses the inner core such that the two-layered core has an overall diameter within a range having a lower limit of 1.20 or 1.30 or 1.40 or 1.50 or 1.51 or 1.52 or 1.525 inches and an upper limit of 1.54 or 1.55 or 1.555 or 1.56 or 1.59 or 1.62 or 1.64 inches.

Cover Structure

The golf ball cores of this invention may be enclosed with one or more cover layers. In addition, as discussed above, an intermediate layer may be disposed between the core and cover layers. The intermediate layer preferably has good moisture vapor barrier properties to prevent moisture from penetrating into the core structure. The cover layers preferably have good impact durability and scuff-resistance. The polyamide compositions of this invention may be used to form at least one of the intermediate and/or cover layers. In other versions, the intermediate layer and cover layers are formed from polymeric materials other than the polyamide compositions of this invention.

For example, the intermediate and cover layers may be formed from a wide variety of materials including, for example, polyurethanes; polyureas; copolymers, blends and hybrids of polyurethane and polyurea; ethylene acid copolymer ionomer resins (for example, Surlyn® ionomer resins and HPF® 1000 and HPF® 2000, commercially available from DuPont; Iotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, commercially available from Arkema Inc; cross-linked trans-polyisoprene and blends thereof; polyester-based thermoplastic elastomers, such as Hytrel®, commercially available from DuPont; polyurethane-based thermoplastic elastomers, such as Elastollan®, commercially available from BASF; synthetic or natural vulcanized rubber; and combinations thereof. Castable polyurethanes, polyureas, and hybrids of polyurethanes-polyureas are particularly desirable because these materials can be used to help make a golf ball having high resiliency and a soft feel. By the term, "hybrids of polyurethane and polyurea," it is meant to include copolymers and blends of polyurethanes and polyureas.

Polyurethanes, polyureas, and blends, copolymers, and hybrids of polyurethane/polyurea are also particularly suitable for forming cover layers. When used as cover layer materials, polyurethanes and polyureas can be thermoset or thermoplastic. Thermoset materials can be formed into golf ball layers by conventional casting or reaction injection molding techniques. Thermoplastic materials can be formed into golf ball layers by conventional compression or injection molding techniques.

In one preferred embodiment, the ball includes a dual-cover comprising inner and outer cover layers. The inner cover layer is preferably formed from a composition comprising an ionomer or a blend of two or more ionomers that helps impart hardness to the ball. The inner cover layer preferably has a material hardness of 95 Shore C or less, or less than 95 Shore C, or 92 Shore C or less, or 90 Shore C or less, or a material hardness within a range having a lower limit of 60 or 65 or 70 or 75 or 80 or 84 or 85 Shore C and an upper limit of 90 or 92 or 95 Shore C. The thickness of the inner cover layer is preferably within a range having a lower limit of 0.010 or 0.015 or 0.020 or 0.030 inches and an upper limit of 0.035 or 0.045 or 0.080 or 0.120 inches. The outer cover layer preferably has a material hardness of 85 Shore C or less. The thickness of the outer cover layer is preferably within a range having a lower limit of 0.010 or 0.015 or 0.025 inches and an upper limit of 0.035 or 0.040 or 0.055 or 0.080 inches.

In a particular embodiment, the inner cover layer is formed from a composition comprising a high acid ionomer. A particularly suitable high acid ionomer is Surlyn 8150® (DuPont). Surlyn 8150® is a copolymer of ethylene and methacrylic acid, having an acid content of 19 wt %, which is 45% neutralized with sodium. In another particular embodiment, the inner cover layer is formed from a composition comprising a high acid ionomer and a maleic anhydride-grafted non-ionomeric polymer. A particularly suitable maleic anhydride-grafted polymer is Fusabond 525D® (DuPont), which is a maleic anhydride-grafted, metallocene-catalyzed ethylene-butene copolymer having about 0.9 wt % maleic anhydride grafted onto the copolymer. One example of a blend of high acid ionomer and maleic anhydride-grafted polymer is 84 wt. %/16 wt. % blend of Surlyn 8150® and Fusabond 525D®. Blends of high acid ionomers with maleic anhydride-grafted polymers are further disclosed, for example, in U.S. Pat. Nos. 6,992,135 and 6,677,401, the entire disclosures of which are hereby incorporated herein by reference.

In another embodiment, the inner cover layer is formed from a composition comprising a 50/45/5 blend of Surlyn® 8940/Surlyn® 9650/Nucrel® 960, and, in a particularly preferred embodiment, has a material hardness of from 80 to 85 Shore C. In another particular embodiment, the inner cover layer is formed from a composition comprising a 50/25/25 blend of Surlyn® 8940/Surlyn® 9650/Surlyn® 9910, preferably having a material hardness of about 90 Shore C. In one preferred version, a blend of 50% Surlyn® 7940 and 50% Surlyn® 8940 is used to form the inner cover. In yet another embodiment, the inner cover layer is preferably formed from a composition comprising a 50/50 blend of Surlyn® 8940/Surlyn® 9650, preferably having a material hardness of about 86 Shore C. Surlyn® 8940 is an ethylene/methacrylic acid copolymer in which the MAA acid groups have been partially neutralized with sodium ions. Surlyn® 9650 and Surlyn® 9910 are two different grades of ethylene/methacrylic acid copolymer in which the MAA acid groups have been partially neutralized with zinc ions. Surlyn® 7940 is a copolymer of about 85% ethylene and 15% methacrylic acid that has been neutralized with lithium ions. Nucrel® 960 is an ethylene/methacrylic acid copolymer resin nominally made with 15 wt % methacrylic acid, and available from DuPont.

As discussed above, the dual-core of the golf ball may be enclosed with a single-layered or multi-layered covers. In one embodiment, a single-layered cover having a thickness in the range of about 0.015 to about 0.090 inches, more preferably about 0.030 to about 0.070 inches, is formed. The cover has a hardness of about Shore D 80 or less, more preferably 70 or less, and most preferably about 60 or less. In another embodiment, a multi-layered cover comprising inner and outer cover layers is formed, where the inner cover layer preferably has a thickness of about 0.011 inches to about 0.110 inches, more preferably about 0.02 inches to about 0.08 inches. In this version, the inner cover layer is formed from a blend of partially- or fully-neutralized ionomers, and the cover has a Shore D hardness of greater than about 55, more preferably greater than about 60, and most preferably greater than about 65. The outer cover layer, in this embodiment, preferably has a thickness of about 0.010 inches to about 0.100 inches, more preferably about 0.02 inches to about 0.06 inches, and most preferably about 0.025 inches to about 0.045 inches, with a hardness of about 80 Shore D or less, more preferably 70 or less, and most preferably about 60 or less. Thus, the cover may comprise two or more layers and preferably has an overall thickness of about 0.020 to about 0.160 inches. The inner cover layer is harder than the outer cover layer in this version. A preferred outer cover layer is a castable or reaction injection molded polyurethane, polyurea or copolymer, blend, or hybrid thereof having a Shore D hardness of about 40 to about 50. In another multi-layer cover, dual-core embodiment, the outer cover and inner cover layer materials and thickness are the same but, the hardness range is reversed; that is, the outer cover layer is harder than the inner cover layer.

Golf Ball Constructions

As discussed above, the thermoplastic polyamide compositions of this invention may be used to form a core for any suitable ball construction, including, for example, three-piece, four-piece, and five-piece designs.

The solid cores for the golf balls of this invention may be made using any suitable conventional technique such as, for example, compression or injection molding. Typically, the inner core is formed by compression molding a slug of uncured or lightly cured rubber material into a spherical structure. The outer core, which surrounds the inner core, is formed by molding the polyamide composition over the inner core. Compression or injection molding techniques may be used. Then, the intermediate and/or cover layers are applied. Prior to this step, the core structure may be surface-treated to increase the adhesion between its outer surface and the next layer that will be applied over the core. Such surface-treatment may include mechanically or chemically-abrading the outer surface of the core. For example, the core may be subjected to corona-discharge, plasma-treatment, silane-dipping, or other treatment methods known to those in the art.

The cover layers are formed over the core or ball subassembly (the core structure and any intermediate layers disposed about the core) using a suitable technique such as, for example, compression-molding, flip-molding, injection-molding, retractable pin injection-molding, reaction injection-molding (RIM), liquid injection-molding, casting, spraying, powder-coating, vacuum-forming, flow-coating, dipping, spin-coating, and the like. Preferably, each cover layer is separately formed over the ball subassembly. For example, an ethylene acid copolymer ionomer composition may be injection-molded to produce half-shells. Alternatively, the ionomer composition can be placed into a compression mold and molded under sufficient pressure, temperature, and time to produce the hemispherical shells. The smooth-surfaced hemispherical shells are then placed around the ball subassembly in a compression mold. Under sufficient heating and pressure, the shells fuse together to form an inner cover layer that surrounds the subassembly. In another method, the ionomer composition is injection-molded directly onto the core using retractable pin injection molding. An outer cover layer comprising a polyurethane composition may be formed by using a casting process.

For example, in one version of the casting process, a liquid mixture of reactive polyurethane prepolymer and chain-extender (curing agent) is poured into lower and upper mold cavities. Then, the golf ball subassembly is lowered at a controlled speed into the reactive mixture. Ball suction cups can hold the ball subassembly in place via reduced pressure or partial vacuum. After sufficient gelling of the reactive mixture (typically about 4 to about 12 seconds), the vacuum is removed and the intermediate ball is released into the mold cavity. Then, the upper mold cavity is mated with the lower mold cavity under sufficient pressure and heat. An exothermic reaction occurs when the polyurethane prepolymer and chain extender are mixed and this continues until the cover material encapsulates and solidifies around the ball subassembly. Finally, the molded balls are cooled in the mold and removed when the molded cover is hard enough so that it can be handled without deformation.

After the golf balls have been removed from the mold, they may be subjected to finishing steps such as flash-trimming, surface-treatment, marking, coating, and the like using techniques known in the art. For example, in traditional white-colored golf balls, the white-pigmented cover may be surface-treated using a suitable method such as, for example, corona, plasma, or ultraviolet (UV) light-treatment. Then, indicia such as trademarks, symbols, logos, letters, and the like may be printed on the ball's cover using pad-printing, ink-jet printing, dye-sublimation, or other suitable printing methods. Clear surface coatings (for example, primer and top-coats), which may contain a fluorescent whitening agent, are applied to the cover. The resulting golf ball has a glossy and durable surface finish.

In another finishing process, the golf balls are painted with one or more paint coatings. For example, white primer paint may be applied first to the surface of the ball and then a white top-coat of paint may be applied over the primer. Of course, the golf ball may be painted with other colors, for example, red, blue, orange, and yellow. As noted above, markings such as trademarks and logos may be applied to the painted cover of the golf ball. Finally, a clear surface coating may be applied to the cover to provide a shiny appearance and protect any logos and other markings printed on the ball.

Figure 2:
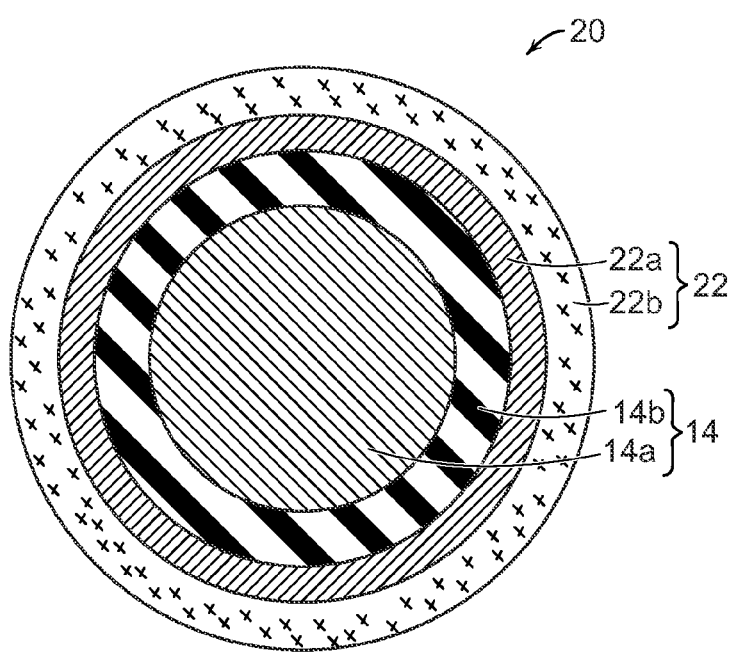
FIG. 2 is a cross-sectional view of a four-piece golf ball having a dual-core comprising an inner core/outer core; an inner cover layer; and an outer cover layer made in accordance with the present invention.

Referring to FIG. 1, one version of a golf ball that can be made in accordance with this invention is generally indicated at (10). The ball (10) contains a dual-core (14) having an inner core (center) (14a) and outer core layer (14b) surrounded by a single-layered cover (16). The center (14a) is formed preferably from a rubber composition as discussed above. The outer core layer (14b) is formed from a polyamide composition as discussed above. In FIG. 2, a golf ball (20) containing the above-described dual-core (14) is surrounded by a dual-cover (22) having an inner cover layer (22a) and outer cover layer (22b), which may be formed from any of the cover materials described above.

The surfaces of the golf balls shown in FIGS. 1-2 may have various dimple patterns to modify the aerodynamic properties of the ball. It should be understood the golf balls shown in FIGS. 1-2 are for illustrative purposes only and not meant to be restrictive. Other golf ball constructions can be made in accordance with this invention.

For example, a golf ball containing an inner core (center); an intermediate core layer; and an outer core layer may be made. The center preferably has a diameter within a range having a lower limit of 0.100 or 0.125 or 0.250 inches and an upper limit of 0.375 or 0.500 or 0.750 or 1.00 or 1.30 inches. The intermediate core layer preferably has a thickness within a range having a lower limit of 0.050 or 0.100 or 0.150 or 0.200 inches and an upper limit of 0.300 or 0.350 or 0.400 or 0.500 inches. The outer core layer encloses the center and intermediate core layer structure such that the multi-layer core has an overall diameter within a range having a lower limit of 1.40 or 1.45 or 1.50 or 1.55 inches and an upper limit of 1.58 or 1.60 or 1.62 or 1.66 inches.

In one embodiment, the inner core (center) is made of the polyamide/acid anhydride-modified/fatty acid additive composition of this invention. The surrounding intermediate core layer is made of a rubber composition comprising a base rubber such as, for example, polybutadiene, polyisoprene, ethylene propylene rubber (EPR), ethylene propylene diene rubber (EPDM), styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, and polystyrene elastomers. Finally, the outer core layer also is made of the polyamide/acid anhydride-modified/fatty acid additive composition of this invention.

In the above-described version, the center and outer core layers (polyamide compositions) preferably each has an outer surface hardness of 40 Shore D or greater, more preferably a surface hardness of 60 Shore C or greater, and most preferably a surface hardness of 70 Shore C or greater. For example, the center may have an outer surface hardness within a range having a lower limit of 45 or 55 or 65 Shore D and an upper limit of 75 or 85 or 95 Shore D. Meanwhile, the intermediate core layer (rubber composition) may have an outer surface hardness that is less than that of the center and is preferably 50 Shore C or less; or 60 Shore C or less; or 70 Shore C or less; or 75 Shore C or less; or 80 Shore C or less.

It is recognized that additional golf ball constructions can be made without departing from the spirit and scope of the present invention. For example, in another version, a golf ball containing a multi-layered core having: i) an inner core (center) made of a rubber composition as described above; ii) a surrounding intermediate core layer made of the polyamide composition of this invention; and iii) an outer core layer made of a rubber composition, can be manufactured. In yet another version, both the inner core (center) and intermediate core layer each are made of a rubber composition; and the outer core layer is made of the polyamide composition of this invention. In a further embodiment, both the inner core (center) and intermediate core layer are made of the polyamide composition of this invention; and the outer core layer is made of a rubber composition.

Test Methods

Hardness.

The center hardness of a core is obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to ensure that the golf ball or golf ball subassembly is centered under the durometer indenter before a surface hardness reading is obtained. A calibrated, digital durometer, capable of reading to 0.1 hardness units is used for the hardness measurements. The digital durometer must be attached to, and its foot made parallel to, the base of an automatic stand. The weight on the durometer and attack rate conforms to ASTM D-2240.

In certain embodiments, a point or plurality of points measured along the "positive" or "negative" gradients may be above or below a line fit through the gradient and its outermost and innermost hardness values. In an alternative preferred embodiment, the hardest point along a particular steep "positive" or "negative" gradient may be higher than the value at the innermost portion of the inner core (the geometric center) or outer core layer (the inner surface)—as long as the outermost point (i.e., the outer surface of the inner core) is greater than (for "positive") or lower than (for "negative") the innermost point (i.e., the geometric center of the inner core or the inner surface of the outer core layer), such that the "positive" and "negative" gradients remain intact.

As discussed above, the direction of the hardness gradient of a golf ball layer is defined by the difference in hardness measurements taken at the outer and inner surfaces of a particular layer. The center hardness of an inner core and hardness of the outer surface of an inner core in a single-core ball or outer core layer are readily determined according to the test procedures provided above. The outer surface of the inner core layer (or other optional intermediate core layers) in a dual-core ball are also readily determined according to the procedures given herein for measuring the outer surface hardness of a golf ball layer, if the measurement is made prior to surrounding the layer with an additional core layer. Once an additional core layer surrounds a layer of interest, the hardness of the inner and outer surfaces of any inner or intermediate layers can be difficult to determine. Therefore, for purposes of the present invention, when the hardness of the inner or outer surface of a core layer is needed after the inner layer has been surrounded with another core layer, the test procedure described above for measuring a point located 1 mm from an interface is used.

Also, it should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other. Shore hardness (for example, Shore C or Shore D hardness) was measured according to the test method ASTM D-2240.

Compression.

As disclosed in Jeff Dalton's Compression by Any Other Name, Science and Golf IV, Proceedings of the World Scientific Congress of Golf (Eric Thain ed., Routledge, 2002) ("J. Dalton"), several different methods can be used to measure compression, including Atti compression, Riehle compression, load/deflection measurements at a variety of fixed loads and offsets, and effective modulus. For purposes of the present invention, "compression" refers to Atti compression and is measured according to a known procedure, using an Atti compression test device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Very low stiffness cores will not cause the spring to deflect by more than 1.25 mm and therefore have a zero compression measurement. The Atti compression tester is designed to measure objects having a diameter of 42.7 mm (1.68 inches); thus, smaller objects, such as golf ball cores, must be shimmed to a total height of 42.7 mm to obtain an accurate reading. Conversion from Atti compression to Riehle (cores), Riehle (balls), 100 kg deflection, 130-10 kg deflection or effective modulus can be carried out according to the formulas given in J. Dalton. Compression may be measured as described in McNamara et al., U.S. Pat. No. 7,777,871, the disclosure of which is hereby incorporated by reference.

Coefficient of Restitution ("COR").

The COR is determined according to a known procedure, wherein a golf ball or golf ball subassembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. The COR is then calculated as the ratio of the ball's outgoing transit time period to the ball's incoming transit time period ($COR=V_{out}/V_{in}=T_{in}/T_{out}$).

When numerical lower limits and numerical upper limits are set forth herein, it is contemplated that any combination of these values may be used. Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention.

All patents, publications, test procedures, and other references cited herein, including priority documents, are fully incorporated by reference to the extent such disclosure is not inconsistent with this invention and for all jurisdictions in which such incorporation is permitted.

It is understood that the compositions and golf ball products described and illustrated herein represent only some embodiments of the invention. It is appreciated by those skilled in the art that various changes and additions can be made to compositions and products without departing from the spirit and scope of this invention. It is intended that all such embodiments be covered by the appended claims.

We claim:

1. A golf ball, comprising:
   a) dual core comprising an inner and outer core layer, the inner core having an outer surface and geometric center and the outer core layer having an outer surface and inner surface; the inner core comprising a rubber composition and the outer core layer consisting essentially of a polyamide non-ionomeric composition, the polyamide composition consisting essentially of:
      i) about 40 to about 98% by weight polyamide;
      ii) about 1 to about 60% by weight of an acid anhydride-modified polyolefin; and
      iii) about 1 to about 60% by weight of a fatty acid additive selected from the group consisting of fatty acid salts, fatty acid amides, and mixtures thereof, wherein the center of the inner core and surface of the outer core layer each has a hardness, and the surface hardness of the outer core layer is greater than the center hardness of the inner core; and
   b) a cover having at least one layer disposed about the core, and wherein the acid anhydride-modified polyolefin is an ethylene-vinyl acetate copolymer.

2. The golf ball of claim 1, wherein the polyamide is selected from the group consisting of polyamide 6; polyamide 6,6; polyamide 6,10; polyamide 6,12; polyamide 11; polyamide 12; polyamide 6,9; and polyamide 4,6, and copolymers and blends thereof.

3. The golf ball of claim 1, wherein the acid anhydride used to modify the ethylene-based copolymer is selected from the group consisting of maleic, fumaric, nadic, itaconic, and clorendic acid anhydrides, and substituted derivatives thereof.

4. The golf ball of claim 1, wherein the fatty acid additive is a fatty acid salt and the fatty acid is selected from the group consisting of stearic acid, behenic acid, erucic acid, linoleic acid, oleic acid, palmitic acid, and dimerized derivatives, and mixtures thereof.

5. The golf ball of claim 4, wherein the metal cation of the fatty acid salt is selected from the group consisting of Zn, Na, Li, K, Ca, Mg, Ni, Ba, Mn, Cu, Ti, and Al, and mixtures thereof.

6. The golf ball of claim 1, wherein the fatty acid additive is a fatty acid amide selected from the group consisting of primary monoamides, substituted monoamides, and bisamides.

7. The golf ball of claim 1, wherein the rubber composition has a flex modulus of 1,000 to 60,000 psi and the polyamide composition has a flex modulus of 20,000 psi to 150,000 psi, the flex modulus of the rubber composition being less than the flex modulus of the polyamide composition.

8. The golf ball of claim 1, wherein the center hardness of the inner core is about 15 Shore D or greater and the surface hardness of the outer core is about 40 Shore D or greater, the center hardness of the inner core being less than the surface hardness of the outer core layer.

9. The golf ball of claim 1, wherein the cover is a single layer having a thickness of about 0.015 to about 0.090 inches and is formed from a thermoplastic or thermoset material.

10. The golf ball of claim 9, wherein the cover consists essentially of about 40 to about 99% by weight polyamide; about 1 to about 60% by weight of an acid anhydride-modified polyolefin; and about 1 to about 60% by weight of a fatty acid additive selected from the group consisting of fatty acid salts, fatty acid amides, and mixtures thereof.

11. The golf ball of claim 1, wherein the cover comprises two or more layers and has an overall thickness of about 0.020 to about 0.160 inches and wherein each cover layer is formed from a thermoplastic or thermoset material.

12. The golf ball of claim 11, wherein at least one of the cover layers consists essentially of a polyamide non-ionomeric composition, the polyamide composition consisting essentially of: i) about 40 to about 98% by weight polyamide; ii) about 1 to about 60% by weight of an acid anhydride-modified polyolefin; and iii) about 1 to about 60% by weight of a fatty acid additive selected from the group consisting of fatty acid salts, fatty acid amides, and mixtures thereof.

13. A golf ball, comprising:
a) a dual core having an inner core and outer core layer, the inner core having an outer surface and geometric center and the outer core layer having an outer surface and inner surface; the outer core comprising a rubber composition; and the inner core consisting essentially of a polyamide non-ionomeric composition, the polyamide composition consisting essentially of:
 i) about 40 to about 98% by weight polyamide;
 ii) about 1 to about 60% by weight of an acid anhydride-modified polyolefin; and
 iii) about 1 to about 60% by weight of a fatty acid additive selected from the group consisting of fatty acid salts, fatty acid amides, and mixtures thereof, wherein the center of the inner core and surface of the outer core layer each has a hardness, and the surface hardness of the outer core layer is greater than the center hardness of the inner core; and
b) a cover having at least one layer disposed about the dual core, and wherein the acid anhydride-modified polyolefin is an ethylene-vinyl acetate copolymer.

* * * * *